(12) United States Patent
Ligouy (10) Patent No.: US 6,996,965 B2
(45) Date of Patent: Feb. 14, 2006

(54) PROCESSING ELEMENT FOR AGRICULTURAL MACHINES

(75) Inventor: Jean-Baptiste Ligouy, Lugny-Champagne (FR)

(73) Assignee: Kuhn S.A., Saverne (FR)

( * ) Notice: Subject to any disclaimer, the term of this patent is extended or adjusted under 35 U.S.C. 154(b) by 25 days.

(21) Appl. No.: 10/478,686

(22) PCT Filed: Jun. 4, 2002

(86) PCT No.: PCT/FR02/01879

§ 371 (c)(1),
(2), (4) Date: Dec. 5, 2003

(87) PCT Pub. No.: WO02/098201

PCT Pub. Date: Dec. 12, 2002

(65) Prior Publication Data

US 2004/0168422 A1 Sep. 2, 2004

(30) Foreign Application Priority Data

Jun. 5, 2001 (FR) .................................. 01 07456
Apr. 18, 2002 (FR) .................................. 02 05100

(51) Int. Cl.
*A01D 78/00* (2006.01)

(52) U.S. Cl. ..................... 56/400; 56/16.4 R
(58) Field of Classification Search ............... 56/364, 56/400, 16.4 R; 198/518, 519, 522, 670
See application file for complete search history.

(56) References Cited

U.S. PATENT DOCUMENTS

| 2,328,121 | A | * | 8/1943 | Bartek .......................... 56/400 |
| 2,717,690 | A | * | 9/1955 | Dukelow ...................... 198/518 |
| 2,748,921 | A | * | 6/1956 | White .......................... 198/518 |
| 3,151,436 | A | * | 10/1964 | Johnston ...................... 56/400 |
| 3,977,165 | A | | 8/1976 | Harris et al. |

(Continued)

FOREIGN PATENT DOCUMENTS

| DE | 26 38 917 | 3/1978 |
| DE | 299 07 727 | 9/2000 |
| FR | 2 296 996 | 8/1976 |

(Continued)

*Primary Examiner*—Meredith C. Petravick
(74) *Attorney, Agent, or Firm*—Oblon, Spivak, McClelland, Maier & Neustadt, P.C.

(57) ABSTRACT

A conditioning element for a treatment device to accelerate drying of forage. The conditioning element includes an active part to work the forage and a first connecting part to connect, in a pivoting manner about a connecting axis, the conditioning element to a support. The conditioning element additionally includes a third part arranged such that: a center of gravity of the active part and a center of gravity of the third part lie on each side of a plane passing through the connecting axis and roughly perpendicular to a longitudinal axis of the conditioning element, and a center of gravity of the third part is distant from a plane passing through the connecting axis and containing the center of gravity of the active part. The conditioning element may find application particularly in the field of agricultural mowers.

26 Claims, 6 Drawing Sheets

U.S. PATENT DOCUMENTS

| | | | | |
|---|---|---|---|---|
| 4,021,995 A | * | 5/1977 | Hill | 56/1 |
| 4,060,961 A | | 12/1977 | Anderson et al. | |
| 4,545,188 A | * | 10/1985 | Klinner | 56/364 |
| 4,751,811 A | * | 6/1988 | Groothuis | 56/364 |
| 4,947,626 A | * | 8/1990 | Maier | 56/364 |
| 5,042,243 A | * | 8/1991 | Doering | 56/400 |
| 5,088,275 A | * | 2/1992 | Koorn et al. | 56/364 |
| 6,453,654 B1 | * | 9/2002 | Kraus et al. | 56/16.4 R |

FOREIGN PATENT DOCUMENTS

| | | |
|---|---|---|
| FR | 2 440 145 | 5/1980 |
| FR | 2 717 037 | 9/1995 |
| GB | 842 620 | 7/1960 |
| GB | 1 256 554 | 12/1971 |
| NL | 8 601 315 | 12/1987 |
| WO | 91 03926 | 4/1991 |

* cited by examiner

PROCESSING ELEMENT FOR AGRICULTURAL MACHINES

TECHNICAL FIELD

The present invention relates to the forage treatment devices used in the field of agricultural machinery.

When making hay, the cut grass needs to be completely dried prior to the storage in order for the forage to keep well. Forage treatment devices, also known as conditioners, advantageously make it possible to reduce the time needed for such drying. What these devices actually do is act mechanically to break up the film of wax which envelopes the stalks of the forage. This breaking-up encourages a rapid dissipation of the moisture contained in the plant.

The present invention is concerned more specifically with a conditioning element for such a forage treatment device.

PRIOR ART

In the state of the art, it is known practice to produce a conditioning element comprising:
 an active part intended to work the forage, and
 a connecting part intended to connect, in a pivoting manner about a connecting axis, said conditioning element to a support.

Thus, document FR 2 440 145 discloses a mower comprising a cutting mechanism intended to cut a standing product, for example grass. To do this, said cutting mechanism has four disks arranged in a transverse line of said mower and driven in rotation about a respective vertical axis.

This known mower also comprises a treatment device intended to reduce the time taken for the cut forage to dry. To do this, said forage treatment device comprises a rotor arranged behind said disks. This rotor consists of conditioning elements and a support which is driven in rotation about a horizontal axis.

Each conditioning element is connected, in a pivoting manner, via one of its ends, to said support by means of an articulation of horizontal axis. Because of the centrifugal force generated by the rotation of said support, the conditioning element, during work, extends in a roughly radial direction.

Thus, during work, the forage from the cutting mechanism is carried, by an active part of the conditioning element, along a conditioning sheet to finally be ejected at the rear of said mower. The passage of the forage against said conditioning sheet causes said breaking-up that encourages rapid drying of the cut product.

The free pivoting of the conditioning element with respect to said support advantageously allows said element to retract, toward the rear when viewed in the direction of rotation of said support, if it should encounter an obstacle.

This known conditioning element does, however, have disadvantages.

Specifically, the driving of the forage by the active part generates a resistive force which tends to move the conditioning element away from its radial position. More specifically, the conditioning element is somewhat inclined toward the rear with respect to the direction of rotation of said support. This change in position leads to a reduction in the working diameter of the rotor and therefore to a reduction in its effectiveness.

In addition, when the forage is ejected from said active part, the conditioning element no longer experiences the resistive force. As a result of this, the centrifugal force causes the conditioning element to return suddenly toward the radial position. However, carried by its inertia, this element pivots beyond this radial position and rocks forward with respect to the direction of rotation of the support. The centrifugal force, seeking always to return the conditioning element to a radial position, this time causes this element to pivot backward. The phenomenon then recurs in the opposite direction.

In consequence, between two successive contacts between the active part and the forage, the conditioning element oscillates back and forth about its radial position. This oscillation gives rise to significant wear on the articulation connecting the conditioning element to the support.

Furthermore, the rotational speed of such a rotor is generally between 600 and 1000 revolutions per minute during work. As a result, if the connection between the support and the conditioning element should break, the latter element is ejected from the rotor violently by the centrifugal force. The conditioning element thus ejected constitutes a projectile traveling at a relatively high speed. This projectile may damage other parts of the forage treatment device, particularly the conditioning sheet of far greater concern, such a projectile may also be dangerous to anybody close to the forage treatment device.

SUMMARY OF THE INVENTION

The object of the present invention is to improve the operation and life of the conditioning rotors of the prior art.

To this end, the conditioning element according to the present invention is characterized in that it additionally comprises a third part arranged in such a way that:
 the center of gravity of said active part and the center of gravity of said third part lie on each side of a plane passing through the connecting axis and roughly perpendicular to a longitudinal axis of said conditioning element, and
 the center of gravity of said third part is distant from a plane passing through the connecting axis and containing the center of gravity of said active part.

The present invention also relates to a forage treatment device comprising a rotor driven in rotation about a horizontal axis, said rotor is [sic] made up of:
 a support,
 at least one conditioning element equipped with an active part intended to work the forage, with a first connecting part intended to connect said conditioning element to said support by means of a first connection, and with the third part as defined hereinabove, and
 at least one connecting element intended to collaborate with said first connecting part in such a way as to achieve said first connection between said conditioning element and said support.

Said forage treatment device is characterized in that said conditioning element additionally comprises a bearing surface intended to come into contact against a stop provided on said support or on said connecting element. This contact between said bearing surface and said stop advantageously makes it possible to define a roughly radial position for said active part.

According to another feature of the present invention, the forage treatment device is characterized in that a second connection is provided, this being intended to connect said conditioning element to said support in the event of breakage of said first connection.

If said first connection should fail, said second connection advantageously makes it possible to maintain a connection between said conditioning element and said support. Thus, said conditioning element will not be ejected from the rotor. The risks of damage and injury are therefore eliminated.

BRIEF DESCRIPTION OF THE DRAWINGS

Other features of the invention, to be considered separately or in all possible combinations will become further apparent from the following description of a nonlimiting exemplary embodiment of the invention which is depicted in the appended drawings in which:

FIG. 9 depicts a view in section, on arrow III defined in FIG. 1 and to a different scale, of the rotor of FIG. 8 equipped with conditioning elements of FIG. 6.

EMBODIMENTS OF THE INVENTION

Figure 1:
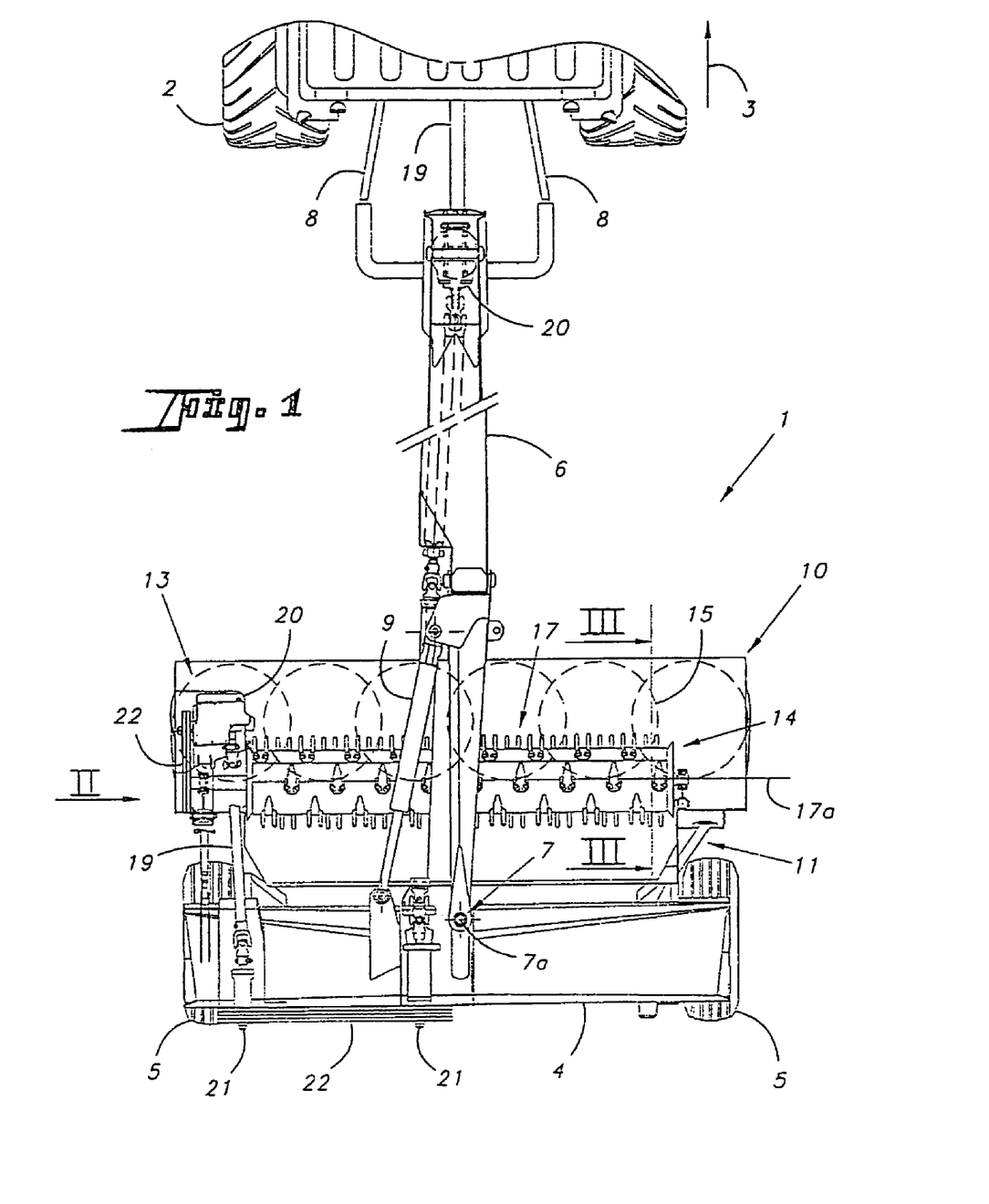
FIG. 1 depicts, viewed from above, an agricultural mower according to the invention.

FIG. 1 depicts, in a view from above, an agricultural mower (1) according to the present invention. Said mower (1) is hitched to a motor vehicle (2) which pulls it in a sense and direction of forward travel indicated by the arrow (3). In the remainder of the description, the ideas of "front" and "rear", "in front of" and "behind" are defined with respect to the direction of forward travel and the ideas of "right" and "left" are defined when viewing said mower (1) from behind in the direction of forward travel (3).

In a way known to those skilled in the art, said mower (1) comprises a chassis (4) which rests on the ground (12) by means of two landwheels (5). Said chassis (4) is connected to the rear end of a drawbar (6) by means of a central articulation (7) of roughly vertical axis (7a). For its part, the front end of said drawbar (6) is connected to the lower links (8) of the hitch of said motor vehicle (2).

In the exemplary embodiment depicted in FIG. 1, said mower (1) is arranged roughly in the continuation of said motor vehicle (2). This configuration is used when said mower (1) is being transported. During work, said central articulation (7) allows said mower (1) to be offset to the right or to the left of said motor vehicle (2) by means of a ram (9). Said mower (1) can thus advantageously operate back and forth.

In a way also known to those skilled in the art, said mower (1) additionally comprises a mowing unit (10) connected to said chassis (4) by means of a suspension (11). Said suspension (11) allows said mowing unit (10) to follow unevennesses of the ground (12) independently of said chassis (4). Advantageously, said suspension (11) also allows at least some of the weight of said mowing unit (10) to be transferred onto said chassis (4). Said mowing unit (10) is made up of a cutting mechanism (13) and of a forage treatment device (14).

Said cutting mechanism (13) is intended to cut a standing product, for example grass. To do this, said cutting mechanism (13) comprises several cutting members (15) driven in rotation about a roughly vertical respective axis. Said cutting members (15), depicted symbolically in FIG. 1, are advantageously arranged in a line transversal to said direction of forward travel (3).

Figure 2:
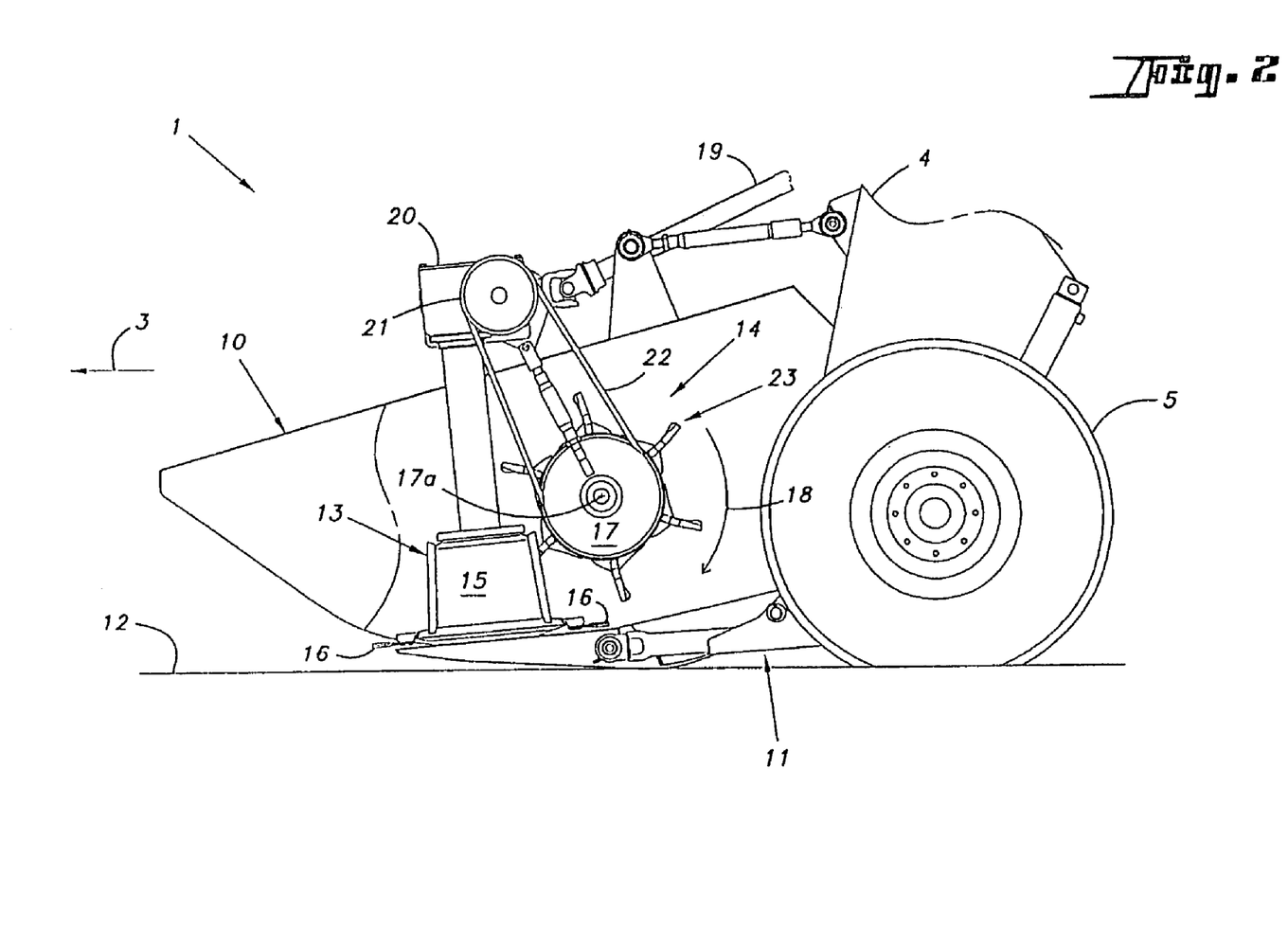
FIG. 2 depicts, viewed from the side in the direction of arrow II defined in FIG. 1, and to a different scale, the agricultural mower of FIG. 1.

As illustrated in FIG. 2, each cutting member (15) supports two cutting elements (16). During work, said cutting elements (16), also known as cutters, describe circles in a roughly horizontal plane. The relatively high speed of movement of said cutting elements (16), due essentially to the rotation of said cutting members (15), allows the standing product to be cut.

For its part, said forage treatment device (14) is intended to accelerate the drying of the product cut by said cutting mechanism (13). To do this, said forage treatment device (14) comprises a rotor (17) driven in rotation about an axis (17a) that is roughly horizontal and transversal to said direction of forward travel (3).

During work, said rotor (17) carries the forage from said cutting mechanism (13) along a conditioning sheet.

The passage of the forage against said conditioning sheet causes a breaking-up that encourages rapid drying of the cut product. As said conditioning sheet is within the competence of the person skilled in the art, it has therefore not been depicted in the figures.

In a way known to those skilled in the art, said mower (1) also comprises transmission elements intended to transmit rotational movement from a power take-off of said motor vehicle (2) as far as said cutting elements (16) and said rotor (17). These transmission elements are, in particular, telescopic shafts with universal joints (19), transmission boxes (20), pulleys (21) and belts (22).

Certain elements of said mower (1) have been depicted only partially in FIGS. 1 and 2 in order to make the present invention easier to understand.

In order to carry the forage effectively, said rotor (17) has conditioning elements (23) connected to a support (24) by means of connecting elements (25).

Indeed, each conditioning element (23) is provided with an active part (26) which, during work, extends in an at least roughly radial direction. Said active parts (26) thus act like grabbers to drive the forage along said conditioning sheet.

Figure 3:
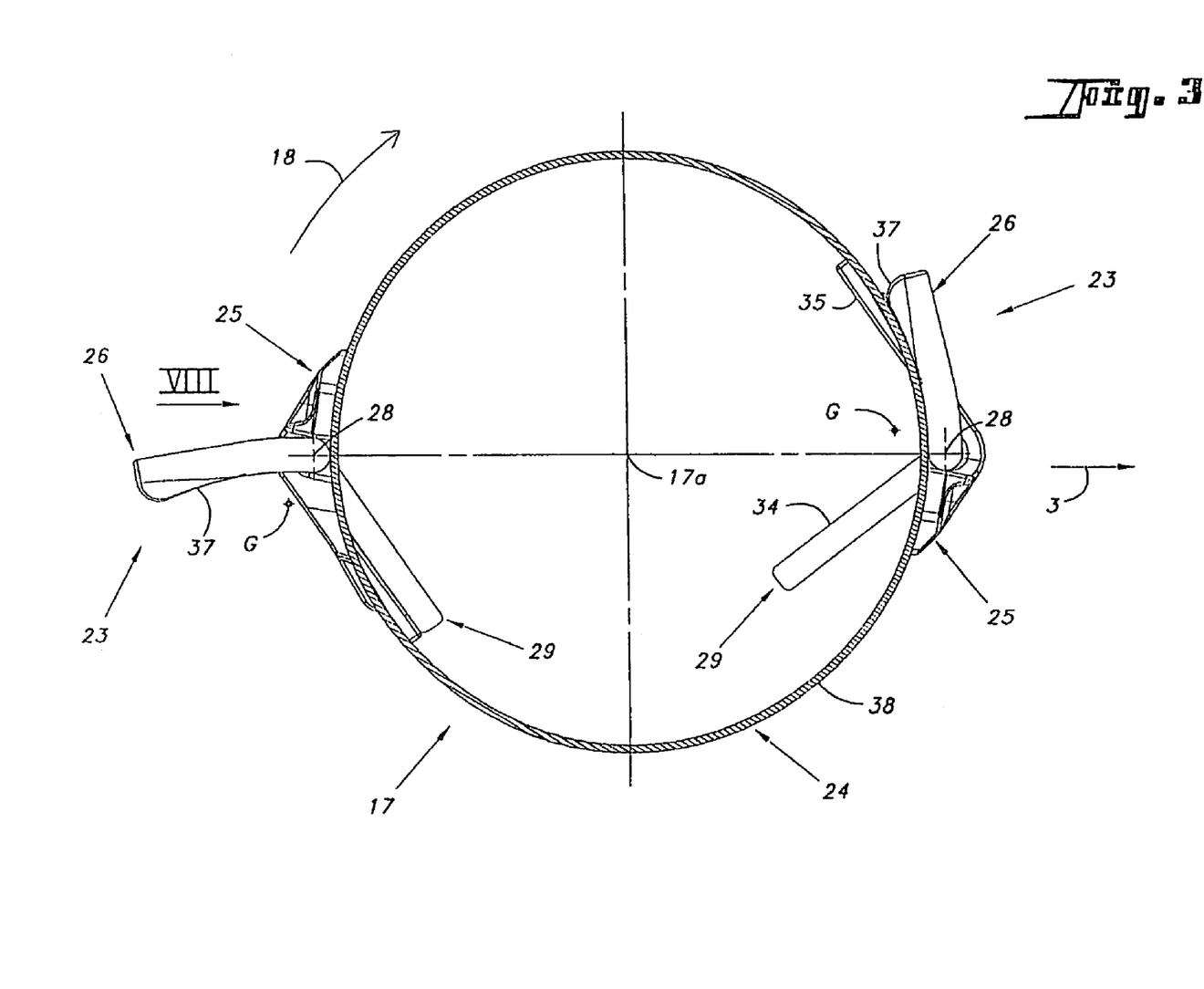
FIG. 3 depicts a view in section, on arrow III defined in FIG. 1, and to a different scale, of a rotor according to the present invention.

As illustrated in FIG. 3 and in a particularly advantageous way, each conditioning element (23) is connected to said support (24) in such a way as to be able to retract if it should encounter an obstacle.

To this end, each conditioning element (23) also comprises a first connecting part (27) intended to connect said conditioning element (23) to said support (24) by means of a first connection. Said first connecting part (27) advantageously collaborates with a respective connecting element (25) so as to produce a connecting axis (28) of the pivot type. The way in which this first connection is achieved will be described in greater detail later on.

As a preference, the connecting axes (28) are at least roughly parallel to the axis of rotation (17a) of said rotor (17). Thus, should an obstacle be encountered, said active part (26) of said conditioning elements (23) can pivot backward with respect to the direction of rotation (18) of said rotor (17).

Figures 4, 5:
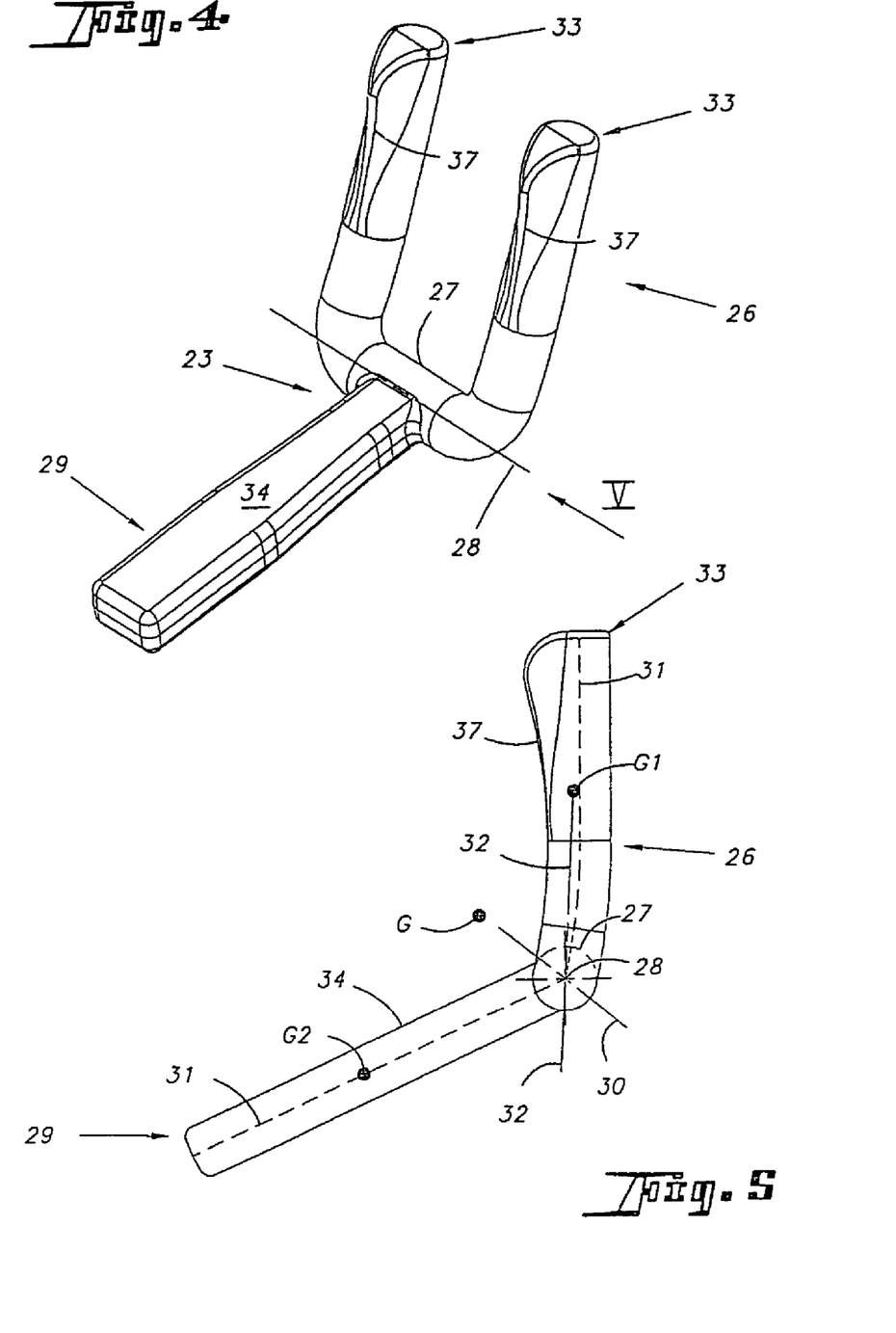
FIG. 4 depicts, in perspective, a conditioning element according to the invention.
FIG. 5 depicts, viewed from the side in the direction of arrow V defined in FIG. 4, the conditioning element of FIG. 4.

According to an important feature of the present invention and more specifically as illustrated in FIG. 5, each conditioning element (23) additionally comprises a third part (29) arranged in such a way that:

the center of gravity (G1) of said active part (26) and the center of gravity (G2) of said third part (29) lie one on each side of a plane (30) passing through the connecting axis (28) and roughly perpendicular to a longitudinal axis (31) of said conditioning element (23), and the center of gravity (G2) of said third part (29) is distant from a plane (32) passing through the connecting axis (28) and containing the center of gravity (G1) of said active part (26).

In the exemplary embodiment depicted in FIGS. 4 and 5, said active part (26) of said conditioning elements (23) comprises two roughly identical fingers (33). Said fingers (33) are offset one with respect to the other in a direction roughly parallel to said connecting axis (28) while at the same time remaining roughly mutually parallel. In addition, said fingers (33) are roughly perpendicular to said connecting axis (28). Said fingers (33) are also curved slightly so as to be able easily to release the forage after the passage of said conditioning sheet.

Advantageously, said first connecting part (27) has a cylindrical shape the longitudinal axis (27a) of which is roughly coincident with said connecting axis (28). Each end of said cylindrical shape extends as far as a respective finger (33). Said active part (26) and said first connecting part (27) thus roughly form a U.

For its part, said third part (29) has a roughly parallelepipedal shape, one of the ends of which advantageously extends as far as said first connecting part (27).

In order to make the present invention easier to understand, the sectioned view of said rotor (17), depicted in FIG. 3, comprises just two conditioning elements (23) connected to said support (24) by means of a respective connecting element (25).

The conditioning element (23) situated to the left in FIG. 3 is depicted in the normal work position. Its active part (26) is therefore arranged roughly radially.

By contrast, the conditioning element (23) situated to the right in FIG. 3 is depicted in the retracted position. Its active part (26) is therefore pivoted, about its connecting axis (28), backward with respect to the direction of rotation (18) of said rotor (17).

According to another important feature of the present invention, the conditioning element (23) comprises a bearing surface (34) intended to come into contact with a stop (35) as it pivots about said connecting axis (28). Contact between said bearing surface (34) and said stop (35) advantageously occurs when said active part (26) is in a roughly radial position.

During work, the centrifugal force due to the rotation of said rotor (17) has a tendency to cause said conditioning element (23) to pivot about said connecting axis (28) in such a way that the center of gravity (G) of said conditioning element (23), said connecting axis (28) and said axis of rotation (17a) are aligned.

During this pivoting, contact between said bearing surface (34) and said stop (35) occurs, in a particularly advantageous way, before said center of gravity (G), said connecting axis (28) and said axis of rotation (17a) come into alignment. As a result, when said bearing surface (34) is in contact with said stop (35), the centrifugal force still exerts on said conditioning element (23) a holding torque which tends to keep said active part (26) in a roughly radial position. In consequence, said conditioning element (23) will not move away from its normal work position unless the resistive torque exerted by the cut product on said active part (26) exceeds the holding torque due to the centrifugal force.

As a preference, the geometry of said conditioning element (23) is determined in such a way that the holding torque exceeds the resistive torque encountered throughout the normal range of use of said forage treatment device (14). Thus, even with a high flow of forage to be treated, said active parts (26) remain in roughly radial position. Said rotor (17) thus maintains its nominal working diameter and its full efficiency.

This holding in position also makes it possible to avoid the phenomenon of oscillation about the radial position from which the conditioning elements of the prior art suffer. As the articulation between said first connecting part (27) and said connecting element (25) is less stressed, the life of said rotor (17) is thus greatly lengthened.

As another preference, the geometry of said conditioning element (23) is determined in such a way that the torque exerted by the centrifugal force tends to decrease when said active part (26) moves away from the radial position. Thus, said conditioning element (23) retracts more readily if it should encounter an obstacle.

As illustrated by the conditioning element (23) depicted to the right in FIG. 3, in the completely retracted position said active part (26) advantageously occupies a roughly tangential position. As a result, relatively bulky obstacles can pass through said forage treatment device (14) without causing any damage.

As a preference, in the completely retracted position said active part (26) comes to bear against said support (24). For this, the rear face (37) of said active part (26) is provided with a shape that roughly complements the exterior shape of said support (24).

Also as a preference, in the completely retracted position, the torque exerted by said centrifugal force on said conditioning element (23) remains positive and non-zero. Thus, once said obstacle has passed, said active part (26) automatically returns to the normal work position, namely the roughly radial position.

As illustrated in FIG. 3, said support (24) is achieved by means of a cylindrical tube (38) the longitudinal axis of which is roughly coincident with said axis of rotation (17a). Advantageously, the periphery of said tube (38) extends up close to said first connecting parts (27). A support of maximum diameter is thus obtained, making it possible to reduce the risks of the cut product wrapping itself around said rotor (17).

Advantageously, one face of said third part (29) constitutes said bearing surface (34) for the corresponding conditioning element (23). For its part, said stop (35) is produced by means of a face of said connecting element (25).

Also advantageously, said bearing surface (34) and said stop (35) are situated inside said tube (38). As a result, said bearing surface (34) and said stop (35) are protected from any wear due to the rubbing of the cut product.

As a preference, the surface of said tube (38) has notches (50) in which said connecting elements (25) engage. Each connecting element (25) is advantageously held removably in said corresponding notch, for example by means of two screws. Replacement of a conditioning element (23) and/or of a connecting element (25) can thus be performed quickly if needed.

In the exemplary embodiment depicted in FIGS. 1 and 2, said conditioning elements (23) are distributed across the entire surface of said tube (38). More specifically, as illustrated in FIG. 2, said conditioning elements (23) are arranged uniformly at the periphery of said tube (38) with an angular offset of about 60 degrees. As illustrated in FIG. 1, said conditioning elements (23) are also distributed along the entire length of said tube (38). Advantageously, the longitudinal offset between two consecutive conditioning elements (23) corresponds roughly to the diameter of one of said fingers (33). Thus, as said rotor (17) rotates, the entire length of said covering sheet is swept by said fingers (23).

In the exemplary embodiment depicted in FIG. 3, all of said third part (29) is protected from wear caused by the rubbing of the cut product either by said tube (38) or by said connecting element (25). The material of which said third part (29) is made may therefore advantageously differ from the material of which said active part (26) is made.

As described previously, said first connecting part (27) of said conditioning element (23) collaborates with said respective connecting elements (25) in order to produce said first connection. To do this, said connecting element (25) is equipped with a recess of a shape that complements the cylindrical shape of said first connecting part (27). During assembly of this exemplary embodiment of said rotor (17), the cylindrical shape of said first connecting part (27) becomes lodged in the recess of said connecting element (25) so as to produce said connecting axis (28) of the pivot type.

According to another important feature of the present invention, a second connection intended to connect said conditioning element (23) to said support (24) in the event of breakage of said first connection is provided.

In the exemplary embodiment depicted in FIGS. 6 to 9, if said first connection should break, said second connection is established more specifically between said conditioning element (23) and said tube (38). As a preference, said second connection is established between a second connecting part of said conditioning element (23) and said tube (38). In a particularly advantageous way, said second connection is established between said third part (29) and said tube (38).

Figures 6, 7:
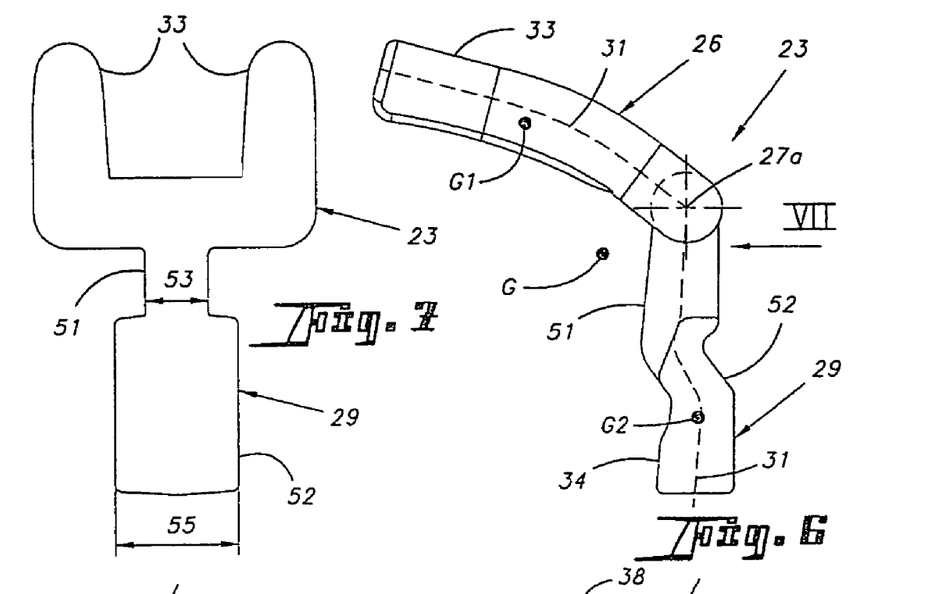
FIG. 6 depicts, viewed from the side in the direction of arrow V defined in FIG. 4, another exemplary embodiment of a conditioning element according to the present invention.
FIG. 7 depicts, viewed from the side in the direction of the arrow VII defined in FIG. 6, the conditioning element of FIG. 6.
Figure 6:
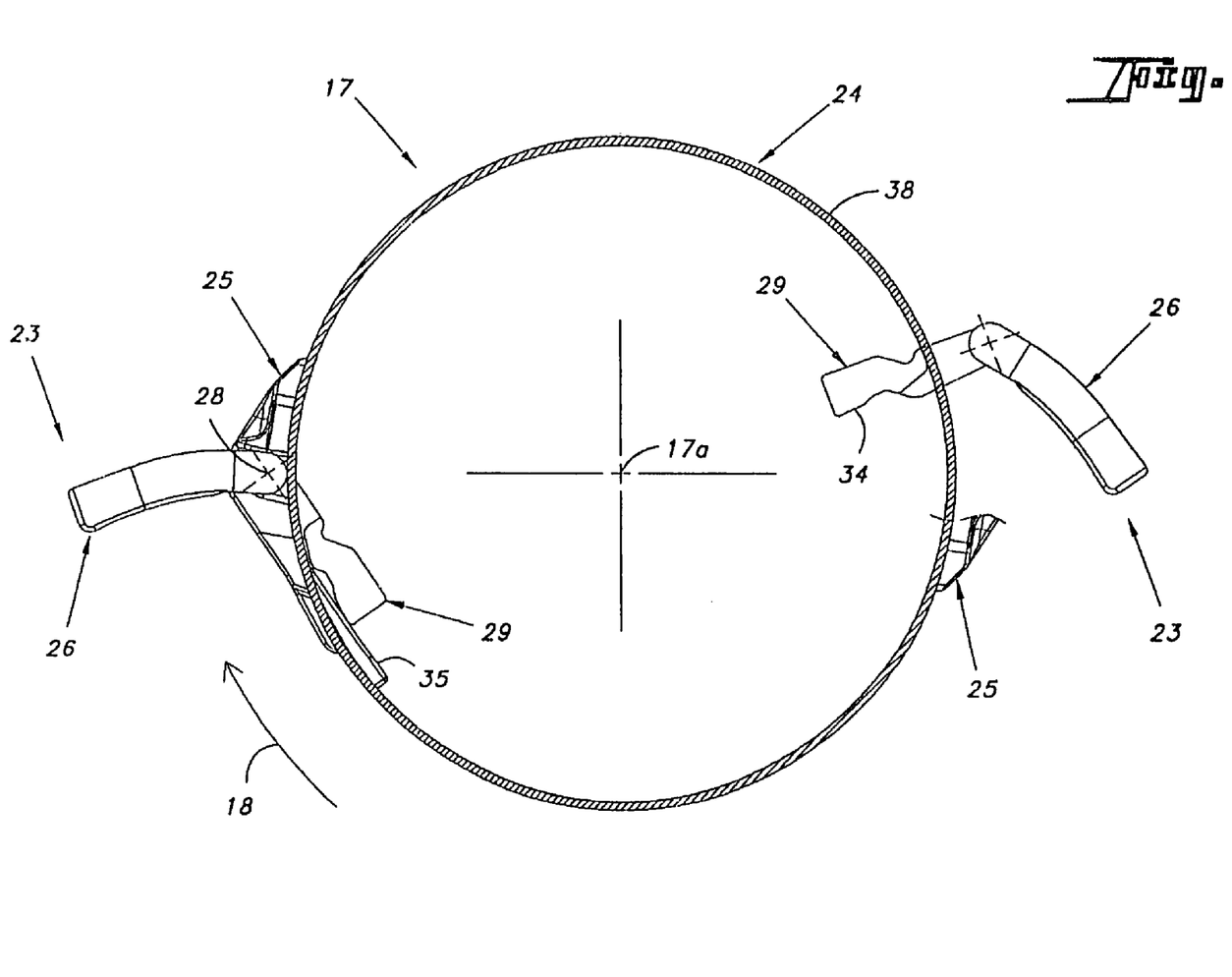

To achieve this and as illustrated in FIGS. 6 and 7, said second connecting part (29) additionally comprises a body (51) and a head (52). Said body (51) is connected to said first connecting part (27) and said head (52) is advantageously distant from said axis (27a) of said first connecting part (27). In addition, the width (55) of said head (52), viewed in the direction of said axis (27a), exceeds the width (53) of said body (51). As a preference, said third part (29) extends at least appreciably perpendicular to said first connecting part (27).

Figure 8:
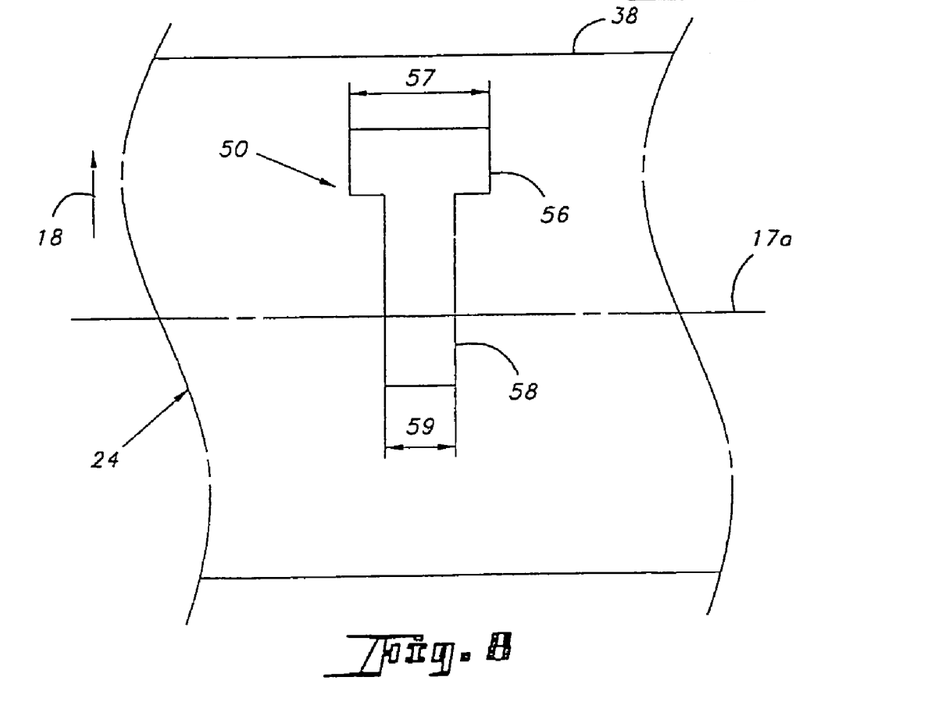
FIG. 8 depicts, viewed from the side in the direction of the arrow VIII defined in FIG. 3 and to a different scale, a part view of another rotor according to the present invention.

As described previously, said third part (29) extends at least partially into said tube (38). To do this and as illustrated in FIG. 8, said notch (50) is made up of an entry region (56) of which the width (57) viewed in the direction of said axis of rotation (17a) is greater than or equal to said width (55) of said head (52). Said entry region (56) allows the at least partial insertion of said third part (29) into said tube (38). Said notch (50) also comprises a holding region (58) of which the width (59), viewed in the direction of said axis of rotation (17a), is less than said width (55) of said head (52) but greater than or equal to said width (53) of said body (51). Said holding region (58) of said tube (38) is intended to collaborate with the third part (29) of said conditioning element (23) so as to produce said second connection. Said notch (50) preferably extends along a plane at least roughly perpendicular to said axis of rotation (17a). In addition, viewed in the direction of rotation (18) of said support (24), said entry region (56) is advantageously arranged ahead of said holding region (58).

In order to make the present invention easier to understand, the sectioned view of said rotor (17), depicted in FIG. 9, comprises just two conditioning elements (23) connected to said tube (38) by means of a respective connecting element (25).

The conditioning element (23) situated to the left in FIG. 9 is depicted in the normal work position. Said conditioning element (23) is therefore connected to said support (24) by means of said first connection.

Said head (52) of said third part (29) is not in contact with said tube (38). Said second connection is therefore without effect.

By contrast, the conditioning element (23) situated to the right in FIG. 9 is depicted following breakage of said first connection. Said head (52) comes into contact with the interior surface of said tube (38). As the width (59) of said holding region (58) is less than the width (55) of said head (52), said conditioning element (23) will therefore not be ejected from said support (24). Any excessive movement, in directions other than the radial direction, of said conditioning element (23) with respect to said support (24) is eliminated by contact between said body (51) and the edges of said holding region (58). Said conditioning element (23) situated to the right is therefore connected to said support (24) by means of said second connection.

As one of the possible causes of breakage of said first connection is breakage of said connecting element (25), the connecting element (25) situated to the right in FIG. 9 is depicted only in part in order to symbolize this breakage.

The mower (1), the forage treatment device (14) and the conditioning element (23) which have just been described are merely one exemplary embodiment which must not in any way be taken to limit the field of protection defined by the claims which follow.

The mower (1) depicted in FIG. 1 is of the mounted type. It goes without saying that the present invention also applies to mowers of the trailed or self-propelled types.

The present invention also relates to agricultural mowers (1) having a different design of cutting mechanism (13).

What is claimed is:

1. A conditioning element for a forage treatment device comprising:
    an active part configured to work forage;
    a first connecting part configured to connect, in a pivoting manner about a connecting axis, the conditioning element to a support; and
    a third part configured such that:
        a center of gravity of said active part and a center of gravity of said third part lie one on each side of a first plane passing through a connecting axis and roughly perpendicular to a longitudinal axis of the active part, and
        a center of gravity of said third part is distant from a second plane passing through the connecting axis, the second plane being disposed along the longitudinal axis of the active part and containing the center of gravity of said active part.

2. The conditioning element as claimed in claim 1, wherein said active part has two fingers offset with respect to each other in a direction roughly parallel to said connecting axis.

3. The conditioning element as claimed in claim 2, wherein said two fingers are roughly mutually parallel and roughly perpendicular to said connecting axis.

4. The conditioning element as claimed in claim 2, wherein said two fingers are appreciably curved.

5. The conditioning element as claimed in claim 2, wherein said connecting part is at least roughly in a shape of a cylinder.

6. The conditioning element as claimed in claim 5, wherein a longitudinal axis of said cylinder is roughly coincident with said connecting axis.

7. The conditioning element as claimed in claim 5, wherein each end of said cylinder extends as far as a respective finger so that said active part and said connecting part roughly form a U.

8. The conditioning element as claimed in claim 1, wherein one end of said third part extends as far as said connecting part.

9. The conditioning element as claimed in claim 1, wherein a material of which said active part is made differs from a material of which said third part is made.

10. A forage treatment device comprising:
a rotor driven in rotation about a horizontal axis, said rotor including at least one conditioning element as claimed in claim 1 connected, in a pivoting manner about a connecting axis defining a first connection, to a support by a connecting element, wherein the conditioning element comprises a bearing surface configured to come into contact against a stop provided on said support or on said connecting element.

11. The forage treatment device as claimed in claim 10, wherein when there is contact between said bearing surface and said stop, said active part of the corresponding conditioning element is oriented roughly radially.

12. The forage treatment device as claimed in claim 10, wherein when there is contact between said bearing surface and said stop, the center of gravity of the corresponding conditioning element is distant from a straight line passing through said connecting axis and an axis of rotation.

13. The forage treatment device as claimed in claim 10, wherein a rear face of the active part of the conditioning element has a shape that roughly complements an exterior shape of said support.

14. The forage treatment device as claimed in claim 10, wherein:
said support is achieved by a tube, and
said bearing surface and said stop are arranged inside said tube, said stop being produced by a face of said connecting element.

15. The forage treatment device as claimed in claim 10, further comprising a second connection configured to connect the conditioning element to said support in event of breakage of said first connection.

16. The forage treatment device as claimed in claim 15, wherein the conditioning element comprises a second connecting part configured to connect the conditioning element to said support by said second connection in event of breakage of said first connection.

17. The forage treatment device as claimed in claim 16, wherein said third part constitutes said second connecting part configured to connect the conditioning element to said support by said second connection in event of breakage of said first connection.

18. The forage treatment device as claimed in claim 17, wherein said third part comprises a body and a head, a width of said head exceeding a width of said body.

19. The forage treatment device as claimed in claim 18, wherein said body is connected to said first connecting part.

20. The forage treatment device as claimed in claim 19, wherein a surface of said support comprises at least one notch allowing at least partial insertion of said third part into said support.

21. The forage treatment device as claimed in claim 20, wherein said notch comprises an entry region having a width greater than or equal to said width of said head.

22. The forage treatment device as claimed in claim 20, wherein said notch comprises a holding region having a width less than said width of said head but greater than or equal to said width of said body.

23. The forage treatment device as claimed in claim 21, wherein, viewed in a direction of rotation of said rotor, said entry region is arranged ahead of said holding region.

24. The forage treatment device as claimed in 23, wherein said notch extends in a plane at least roughly perpendicular to said axis of rotation of said rotor.

25. The forage treatment device as claimed in 10, wherein said connecting element is removably connected to said support.

26. An agricultural mower, comprising a forage treatment device as claimed in claim 10.

* * * * *